United States Patent
Blizard et al.

(10) Patent No.: US 10,465,643 B2
(45) Date of Patent: Nov. 5, 2019

(54) METHOD FOR REDUCING CARBON/COKE IN FUEL INJECTORS IN DUAL FUEL APPLICATIONS

(71) Applicant: Cummins Inc., Columbus, IN (US)

(72) Inventors: Norman C. Blizard, Columbus, IN (US); Timothy P. Lutz, Columbus, IN (US); David B. Snyder, Franklin, IN (US)

(73) Assignee: Cummins Inc., Columbus, IN (US)

( * ) Notice: Subject to any disclaimer, the term of this patent is extended or adjusted under 35 U.S.C. 154(b) by 47 days.

(21) Appl. No.: 15/500,903

(22) PCT Filed: Jul. 31, 2014

(86) PCT No.: PCT/US2014/049182
§ 371 (c)(1),
(2) Date: Jan. 31, 2017

(87) PCT Pub. No.: WO2016/018375
PCT Pub. Date: Feb. 4, 2016

(65) Prior Publication Data
US 2017/0226973 A1 Aug. 10, 2017

(51) Int. Cl.
*F02M 43/04* (2006.01)
*F02D 19/06* (2006.01)
(Continued)

(52) U.S. Cl.
CPC ........... *F02M 43/04* (2013.01); *F02D 19/061* (2013.01); *F02D 19/0623* (2013.01);
(Continued)

(58) Field of Classification Search
CPC ............. F02D 19/0642; F02D 19/0644; F02D 19/0647; F02D 19/081
See application file for complete search history.

(56) References Cited

U.S. PATENT DOCUMENTS 5,195,482 A 3/1993 Smith
5,370,097 A 12/1994 Davis
(Continued)

FOREIGN PATENT DOCUMENTS

EP 1505342 7/2004
JP 2011220284 11/2011
(Continued)

OTHER PUBLICATIONS

International Search Report and Written Opinion for PCT Application No. PCT/US2014/049182, dated Nov. 7, 2014, 15 pgs.

*Primary Examiner* — Sizo B Vilakazi
*Assistant Examiner* — Kevin R Steckbauer
(74) *Attorney, Agent, or Firm* — Faegre Baker Daniels LLP

(57) ABSTRACT

A method of reducing carbonaceous deposits on a fuel injector is provided in which a first fuel composition is supplied to the fuel injector in a dual fuel engine, the first fuel composition comprising natural gas fuel and a first percentage of diesel fuel; and a second fuel composition is supplied to the fuel injector in a dual fuel engine, the second fuel composition comprising a second percentage of diesel fuel that is greater than the first percentage of diesel fuel to cause cavitation to occur within the fuel injector, thereby reducing carbonaceous deposits.

36 Claims, 6 Drawing Sheets

(51) Int. Cl.
*F02D 19/08* (2006.01)
*F02M 43/00* (2006.01)
*F02D 19/10* (2006.01)
*F02D 41/00* (2006.01)

(52) U.S. Cl.
CPC ..... *F02D 19/0642* (2013.01); *F02D 19/0647* (2013.01); *F02D 19/0694* (2013.01); *F02D 19/081* (2013.01); *F02D 19/105* (2013.01); *F02D 41/0025* (2013.01); *F02D 41/0027* (2013.01); *F02M 43/00* (2013.01); *F02D 19/0644* (2013.01); *Y02T 10/36* (2013.01)

(56) References Cited

U.S. PATENT DOCUMENTS

| | | | |
|---|---|---|---|
| 5,379,740 | A | 1/1995 | Moore et al. |
| 6,616,776 | B1 | 9/2003 | Ahmadi et al. |
| 6,955,307 | B2 | 10/2005 | Carlisle et al. |
| 7,019,626 | B1* | 3/2006 | Funk .................. F02D 19/0647 123/205 |
| 7,097,114 | B2* | 8/2006 | Aradi .................. F02M 65/007 239/104 |
| 7,490,784 | B2* | 2/2009 | Fath .................. F02M 61/1833 239/584 |
| 7,913,673 | B2* | 3/2011 | Vanderslice ........ F02D 19/0631 123/27 GE |
| 9,279,372 | B2* | 3/2016 | Monros .................. F02B 43/00 |
| 9,297,344 | B2* | 3/2016 | Gerber ............... F02M 61/1866 |
| 9,784,152 | B2* | 10/2017 | Monros .................. F01M 13/04 |
| 9,797,358 | B2* | 10/2017 | Li ............................ F02D 37/02 |
| 9,945,299 | B2* | 4/2018 | Lund .................. F02D 19/0642 |
| 2005/0116066 | A1* | 6/2005 | Fath .................. F02M 61/1833 239/533.12 |
| 2006/0091239 | A1* | 5/2006 | Aradi .................. F02M 65/007 239/533.2 |
| 2010/0332106 | A1* | 12/2010 | Vanderslice ........ F02D 19/0631 701/103 |
| 2011/0030635 | A1* | 2/2011 | Siuchta ............... F02M 57/025 123/1 A |
| 2011/0257869 | A1* | 10/2011 | Kumar .................. B61L 3/006 701/103 |
| 2012/0180757 | A1* | 7/2012 | Gerber ............... F02M 61/1866 123/294 |
| 2013/0054123 | A1 | 2/2013 | Ikemoto |
| 2013/0125849 | A1 | 5/2013 | Schaberg et al. |
| 2014/0007843 | A1 | 1/2014 | Kaneko |
| 2014/0032084 | A1 | 1/2014 | Gehrke et al. |
| 2015/0000638 | A1* | 1/2015 | Monros .................. F02B 43/00 123/456 |
| 2015/0047614 | A1* | 2/2015 | Kim ...................... F02M 43/04 123/470 |
| 2015/0267626 | A1* | 9/2015 | Lund .................. F02D 19/0642 123/525 |
| 2016/0169143 | A1* | 6/2016 | Monros .................. F01M 13/04 123/525 |
| 2016/0333761 | A1* | 11/2016 | Liu ......................... F01N 3/2006 |
| 2017/0159630 | A1* | 6/2017 | Li ............................ F02D 37/02 |
| 2017/0204792 | A1* | 7/2017 | Thomas ............... F02D 19/0615 |
| 2017/0234245 | A1* | 8/2017 | Bruner .................. F02D 41/221 123/525 |
| 2018/0073446 | A1* | 3/2018 | Ritter .................. F02D 19/061 |
| 2018/0073467 | A1* | 3/2018 | King .................... F02D 19/061 |

FOREIGN PATENT DOCUMENTS

| | | |
|---|---|---|
| WO | WO2013075234 | 5/2013 |
| WO | WO2013156161 | 10/2013 |

* cited by examiner

METHOD FOR REDUCING CARBON/COKE IN FUEL INJECTORS IN DUAL FUEL APPLICATIONS

CROSS REFERENCE TO RELATED APPLICATION

This application is a national stage filing of PCT International Application Serial No. PCT/US2014/049182, filed Jul. 31, 2014, the disclosure of which is hereby expressly incorporated by reference herein in its entirety.

FIELD OF THE DISCLOSURE

The present disclosure generally relates to reduction of carbon/coke deposits from fuel injectors, and more particularly to a method for reducing carbonaceous deposits in fuel injectors in dual fuel engine applications.

BACKGROUND OF THE DISCLOSURE

The introduction of fuel into the cylinders of an internal combustion engine is most commonly achieved using fuel injectors. A commonly used injector is a closed-nozzle injector which includes a nozzle assembly having a spring-biased needle valve element positioned adjacent the injector nozzle for allowing fuel to be injected into the cylinder of an internal combustion engine. The needle valve element moves to allow fuel to pass through the injector nozzle and out the injector orifices or spray holes, thus marking the beginning of the fuel injection event. Fuel injector designs may include reduced nozzle orifice diameters and increased injection pressures to provide increased engine power density and reduced emissions. However, over time, the power resulting from such modern injector orifice and/or spray-hole geometries may degrade as a result of formations of carbonaceous deposits (also called carbon build up or coking) on fuel injector nozzles.

Increased fuel injector nozzle deposit formation occurs when the temperature at the nozzle tip rises. As is known in the art, when zinc levels reach a critical concentration in the fuel, significant coking occurs within a relatively short period. Internal and external deposits on fuel injector nozzles can negatively impact engine behavior as well as produce increased acoustic and pollutant emissions in diesel engines with direct injection. A variety of studies involving direct injection diesel engines show a deterioration of combustion and mixture formation as a direct result of carbonaceous deposits accumulating on the injector nozzle. Moreover, the deposits can also cause an increase in fuel consumption and a reduction in the power output of direct injection diesel engines.

Prior art attempts to mitigate injector nozzle coking have included running the engine with zinc-free fuel to partially reverse the nozzle coking deposition. Chemical mechanisms such as oxidation may also be employed to destroy the organic compounds present in the carbonaceous particles. Moreover, evaporation and desorption may be utilized to reduce the gaseous fraction dissolved in the deposits, however in both approaches an additional step of abrasion is necessary to cause the required breaking-off force to facilitate removal of the carbonaceous deposit layer. Detergent additives to the diesel fuel may also be effective at removing carbon deposits from fuel injector nozzles; however these additives can be expensive and difficult to dispense accurately.

SUMMARY OF THE DISCLOSURE

The various aspects of the present disclosure may be achieved by providing a method for reducing carbonaceous deposits from common rail fuel injectors in dual fuel applications by causing cavitation to occur and abrade off the deposits from the fuel injector nozzle. In one embodiment of the disclosure a method for reducing carbonaceous deposits from common rail fuel injectors in dual fuel applications is disclosed wherein a first fuel composition comprising natural gas fuel and a first percentage of diesel fuel is provided to a fuel injector in what is called the substitution rate of natural gas to diesel fuel. Normal operation of a dual fuel engine would be with a higher substitution rate of natural gas to diesel fuel for economy. This embodiment further includes providing a second fuel composition to the fuel injector comprising a second percentage of diesel fuel that is greater than the first percentage of diesel fuel to cause the diesel fuel to experience cavitation or high flow turbulence to occur within the fuel injector, thereby scavenging off and thus reducing carbonaceous deposits.

According to one aspect of this embodiment, the method further includes a prognostic approach to determine when diesel injection nozzles are sufficiently coked to initiate a scavenging process. One such method provides for a scavenging cycle which occurs when the second fuel composition is provided for a first predetermined time period. When the first time period ends the first fuel composition is once again provided. In a variant of this aspect the second percentage of diesel fuel is at least 50% of the second composition. In a variant of this aspect the cavitation or high flow turbulence reduces carbonaceous deposits adjacent a spray hole of the fuel injector. In another aspect the second percentage of diesel fuel is greater than 95% of the second composition. According to another aspect of the disclosure the second composition is provided for a first determined time period in response to at least one operational parameter satisfying a first condition. In a variant of this aspect at least one operational parameter includes at least one of engine run time, engine load, engine speed, and engine operating temperature. In a variant of this variant the first condition is at least one of engine run time in excess of a predetermined threshold run time, engine load in excess of a predetermined threshold load, engine speed in excess of a predetermined threshold speed, and engine operating temperature in excess of a predetermined threshold operating temperature. According to another variant of this aspect the at least one operational parameter includes at least one of a quantity of natural gas fuel used, a fuel filter restriction percentage, a fuel injector tip temperature, a fuel injector drain fuel temperature, an in-cylinder pressure, and an in-cylinder exhaust gas temperature. In a variant of this variant the first condition further includes at least one of a quantity of natural gas fuel used in excess of a predetermined threshold usage quantity, a fuel filter restriction percentage in excess of a predetermined threshold restriction percentage, a fuel injector tip temperature in excess of a predetermined threshold tip temperature, a fuel injector drain fuel temperature in excess of a predetermined threshold drain fuel temperature, an in-cylinder pressure below a predetermined threshold pressure, and an in-cylinder exhaust gas temperature in excess of a predetermined threshold gas temperature. In this aspect the in-cylinder pressure includes a pressure in a cylinder of a dual fuel engine during a combustion event. Additionally, in this aspect the in-cylinder exhaust gas temperature includes an exhaust gas temperature in the cylinder of a dual fuel engine after the exhaust stroke.

According to another aspect of the disclosure an engine torque output is monitored concurrent with providing the second composition for the first time period. A variant of this aspect includes providing the second composition and then providing the first composition in response to the engine torque output exceeding a predetermined threshold torque output. In another variant, providing the second composition for a first time period includes periodically providing the second composition for the first time period according to a predetermined schedule.

According to another embodiment of the present disclosure a method is provided comprising commanding a fuel supply assembly to provide a first fuel composition to a fuel injector in a dual fuel engine, the first composition comprising natural gas fuel and a first percentage of diesel fuel. This embodiment further includes monitoring an operational parameter of the dual fuel engine and commanding the fuel supply assembly to provide a second fuel composition to the fuel injector for a first time period in response to the operational parameter satisfying a first condition. The second composition comprises an injector cavitation or high flow turbulence diesel fuel threshold value. In this embodiment the second composition includes a percentage of diesel fuel that is greater than or equal to the injector cavitation or high flow turbulence diesel fuel threshold value.

According to one aspect of this embodiment, commanding the fuel supply assembly to provide a second composition further includes commanding the fuel supply assembly to adjust a fuel injector pressure and a fuel flow rate of the second composition. In a variant of this aspect the cavitation reduces carbonaceous deposits adjacent a spray hole of the fuel injector. In another variant the operational parameter is engine run time and the first condition is engine run time in excess of a predetermined threshold run time. In another aspect of the disclosure, commanding the fuel supply assembly to provide a second composition further comprises at least one of determining the first time period in response to the monitored operational parameter and determining the second percentage of diesel fuel in response to the monitored operational parameter. In a variant of this aspect the operational parameter includes at least one of engine load, engine speed, and engine operating temperature. In a variant of this variant the first condition includes at least one of engine load in excess of a predetermined threshold load, engine speed in excess of a predetermined threshold speed, and engine operating temperature in excess of a predetermined threshold operating temperature. In another variant commanding the fuel supply assembly to provide the second composition includes applying an algorithm to determine the second percentage of diesel fuel.

According to another aspect of this embodiment, the method determines a carbon build up factor in response to the operational parameter satisfying a first condition, and determines the first time period based on the carbon build up factor. In a variant of this aspect the operational parameter is engine run time weighted by at least one of a plurality of weight factors and the method further comprises determining a carbon build up factor based on the operational parameter. In this variant the plurality of weight factors includes at least one of engine speed, engine load, and the percentage of natural gas fuel in the first composition. Additionally, in this variant a magnitude of the engine speed weight factor increases as the engine speed increases, a magnitude of the engine load weight factor increases as the engine load increases, and a magnitude of the natural gas fuel weight factor increases as the percentage of natural gas fuel in the first composition increases. According to yet another aspect of this embodiment, the operational parameter includes at least one of quantity of natural gas fuel used, fuel filter restriction percentage, fuel injector tip temperature, fuel injector drain fuel temperature, in-cylinder pressure, and in-cylinder exhaust gas temperature. In a variant of this aspect the first condition further includes at least one of quantity of natural gas fuel used in excess of a predetermined threshold usage quantity, fuel filter restriction percentage in excess of a predetermined threshold restriction percentage, fuel injector tip temperature in excess of a predetermined threshold tip temperature, fuel injector drain fuel temperature in excess of a predetermined threshold drain fuel temperature, in-cylinder pressure below a predetermined threshold pressure, and in-cylinder exhaust gas temperature in excess of a predetermined threshold gas temperature. In this variant the in-cylinder pressure includes a pressure in a cylinder of a dual fuel engine during a combustion event. Additionally, in this variant the in-cylinder exhaust gas temperature includes an exhaust gas temperature in the cylinder of a dual fuel engine after the exhaust stroke. In yet another aspect of this embodiment, commanding the fuel supply assembly to provide the second composition includes applying an algorithm to determine at least one of the second percentage of diesel fuel, the first time period, and a carbon build up factor.

According to yet another embodiment of the present disclosure an apparatus is provided comprising a controller including a first interface configured to provide control signals to a fuel supply assembly for providing a dual fuel composition including a diesel percentage to a dual fuel engine, a second interface configured to receive parameter signals corresponding to an operational parameter of the dual fuel engine, and logic configured to monitor the parameter signals and to generate the control signals to cause an increase in the diesel percentage of the dual fuel composition in response to the operational parameter satisfying a condition, thereby causing cavitation to occur in a fuel injector. According to one aspect of this embodiment, the operational parameter is engine torque output and the condition is engine torque output below a predetermined threshold torque output. In a variant of this aspect the logic is further configured to generate control signals to cause an increase in the diesel percentage of the dual fuel composition in response to the engine torque output below a predetermined threshold torque output. In another aspect of this embodiment, the logic is further configured to generate control signals to cause an increase in the diesel percentage of the dual fuel composition for a first time period in response to the operational parameter satisfying the condition. In yet another aspect, the logic is further configured to generate control signals to periodically cause an increase in the diesel percentage of the dual fuel composition for a first time period according to at least one of, a predetermined schedule, an algorithm, and a carbon build up factor.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 1:
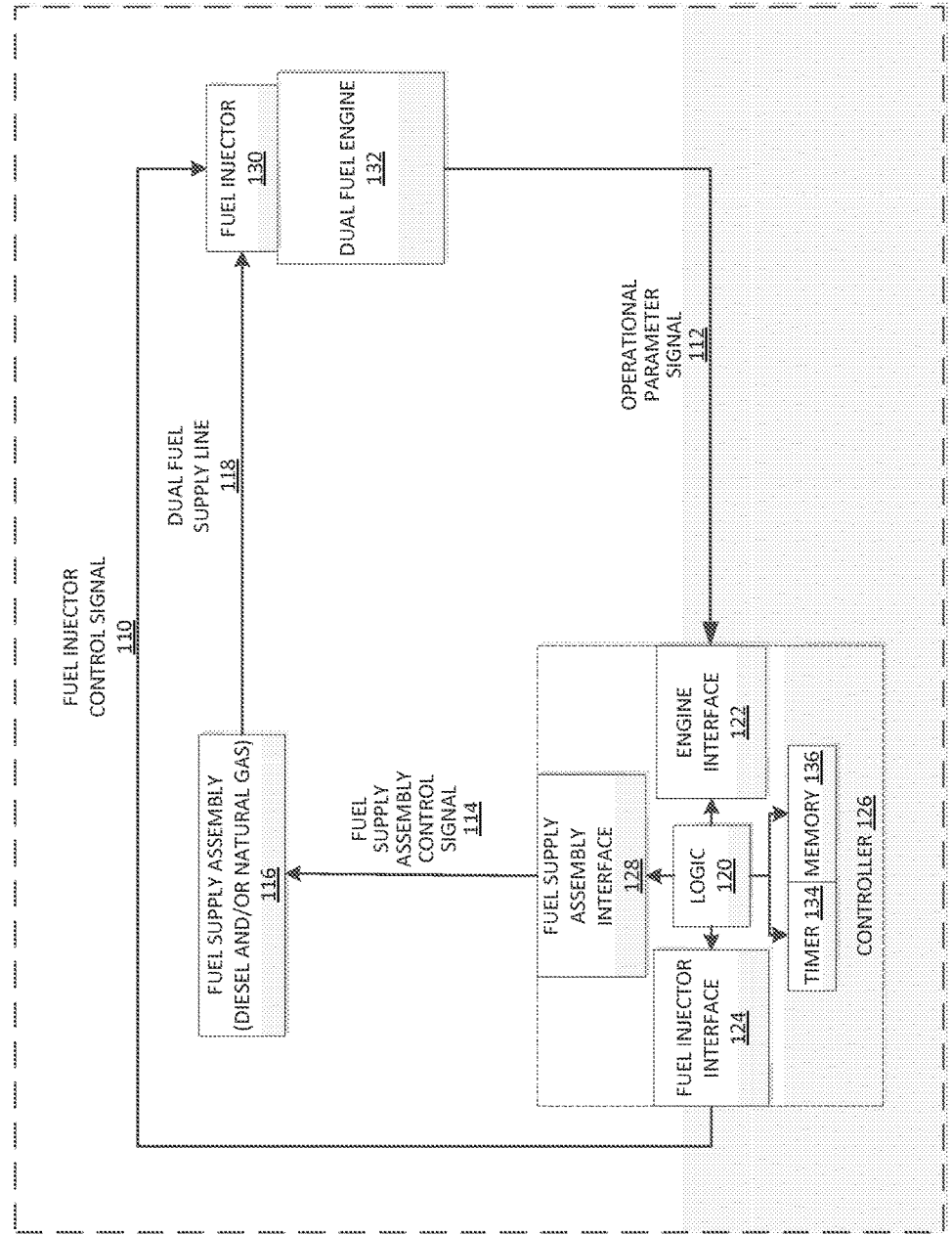
FIG. 1 is a conceptual block diagram of an apparatus for implementing any of the methods depicted in FIGS. 2-5.

FIG. 1 is a conceptual block diagram of a system 100 according to the present disclosure. System 100 generally includes a controller 126, a fuel supply assembly 116, dual fuel supply line 118, fuel injector 130, and dual fuel engine 132. Controller 126 includes fuel supply assembly interface 128, fuel injector interface 124, engine interface 122, timer 134, memory 136, and logic 120. Controller 126 sends fuel injector control signals 110 to fuel injector 130 through interface 124, sends fuel supply assembly control signals 114 to fuel supply assembly 116 through interface 128, and receives operational parameter signals 112 from engine 132 through interface 122.

When system 100 is operating, logic 120 configured within controller 126 provides commands and generates control signals 110 and 114 as is further described below. Under certain circumstances, logic 120 causes controller 126 to send fuel supply assembly control signal 114 through interface 128 to cause fuel supply assembly 116 to provide a first composition of fuel to fuel injector 130 via dual fuel supply line 128. The first composition includes natural gas fuel and a first percentage of diesel fuel and is provided to dual fuel engine 132 via fuel injector 130. During engine operation, logic 120 causes controller 126 to send fuel injector control signals 110 through interface 124 to cause fuel injector 130 to provide injections of the dual fuel composition to dual fuel engine 132. Also during engine operation, dual fuel engine 132 generates a variety of different operational parameter signals 112 (as is further described below), which are received by controller 126 at interface 122. According to the various methods of the present disclosure, controller 126 causes fuel supply assembly 116 to provide a different dual fuel composition in response to one or more operational parameter signals 112 indicating that the corresponding one or more operational parameters of engine 132 satisfy a certain condition.

In each of the embodiments described below, if an operational parameter signal 112 satisfies a first condition, logic 120 causes controller 126 to command fuel supply assembly 116 to provide a second composition of fuel including a greater percentage of diesel fuel than the first percentage of diesel fuel in the first composition. Logic 120 may also cause controller 126 to apply an algorithm to determine the second percentage of diesel fuel in response to one or more monitored operational parameter signals 112 satisfying a certain condition. The second composition includes a specific second percentage of diesel fuel calculated by the algorithm. The operational parameter signals 112 received through interface 122 are provided as inputs to the algorithm. Thus, controller 126 applies the algorithm and determines the second percentage of diesel fuel in response to one or more monitored operational parameter signals 112 satisfying a certain condition. The increased diesel percentage causes cavitation to occur in fuel injector 130 thereby reducing carbonaceous deposits on the fuel injector nozzle. In at least one of the embodiments described below (e.g. method 200B), controller 126 may also apply the algorithm to determine an estimated percentage of fuel injector carbonaceous deposit accumulation. The second composition is provided for a first time period that may be determined in a variety of different ways. For example, as is further described below, in one embodiment the time period, which may be measured by timer 134, may be of a predetermined duration according to a schedule stored in memory 136. Additionally, in at least one of the embodiments described below (e.g. method 500) logic 120 may apply the algorithm to determine the first time period.

Engine interface 122 may comprise a plurality of electronic components configured to receive analogue or digital inputs from a plurality of sensors coupled to dual fuel engine 132. Engine interface 122 may, for example, convert an analog voltage value to a corresponding digital signal that may be received by controller 126 such that commands may be provided in response to the value assigned to the digital signal. Likewise fuel injector interface 124 and fuel supply assembly interface 128 may also comprise a plurality of electronic components configured to provide voltage and/or current values to cause fuel injector 130 to inject fuel and fuel supply assembly 116 to supply fuel.

Figure 2A:
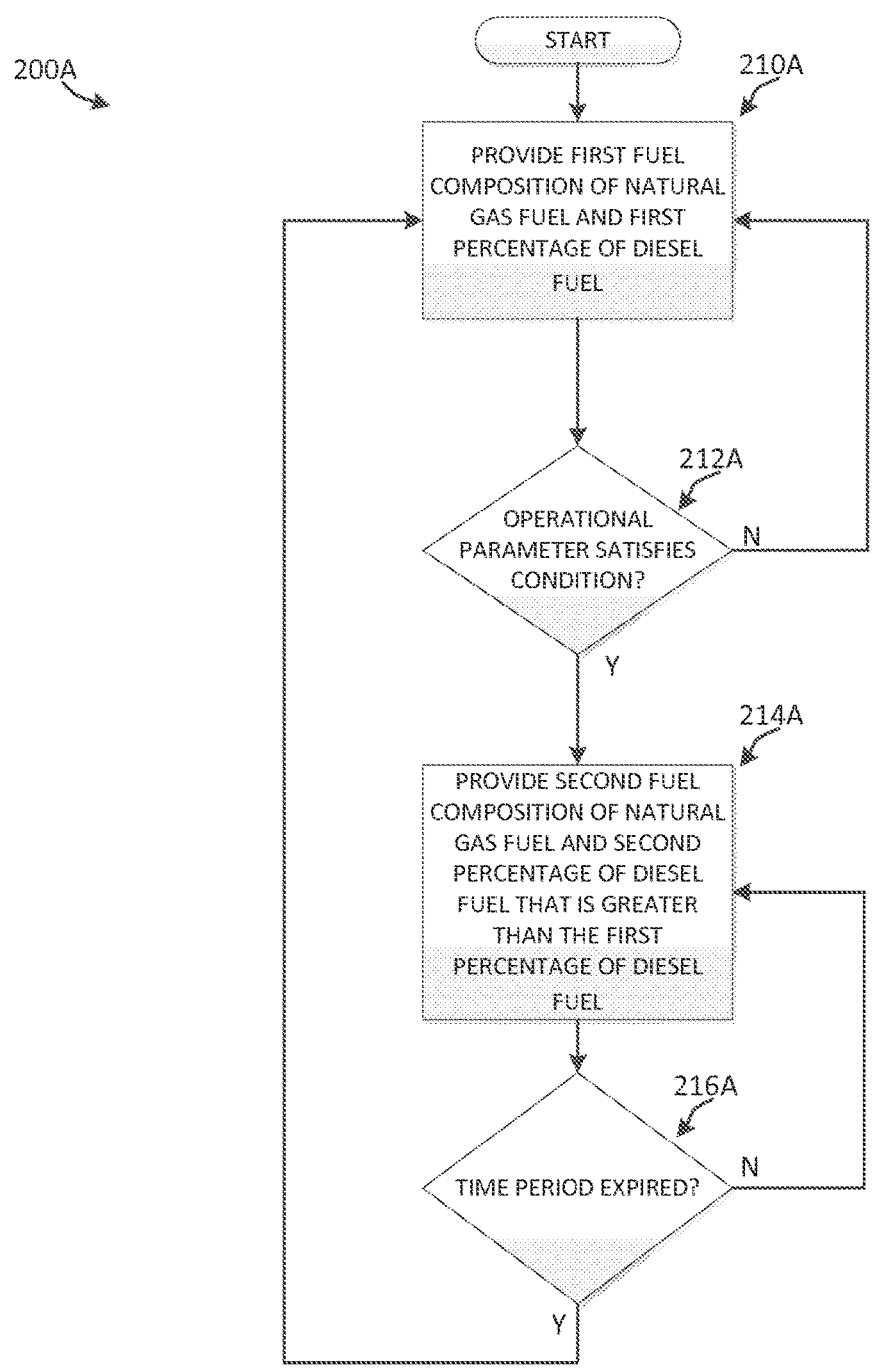
FIGS. 2-5 are flow diagrams of methods for reducing carbon/coke according to the present disclosure.
Figure 2B:
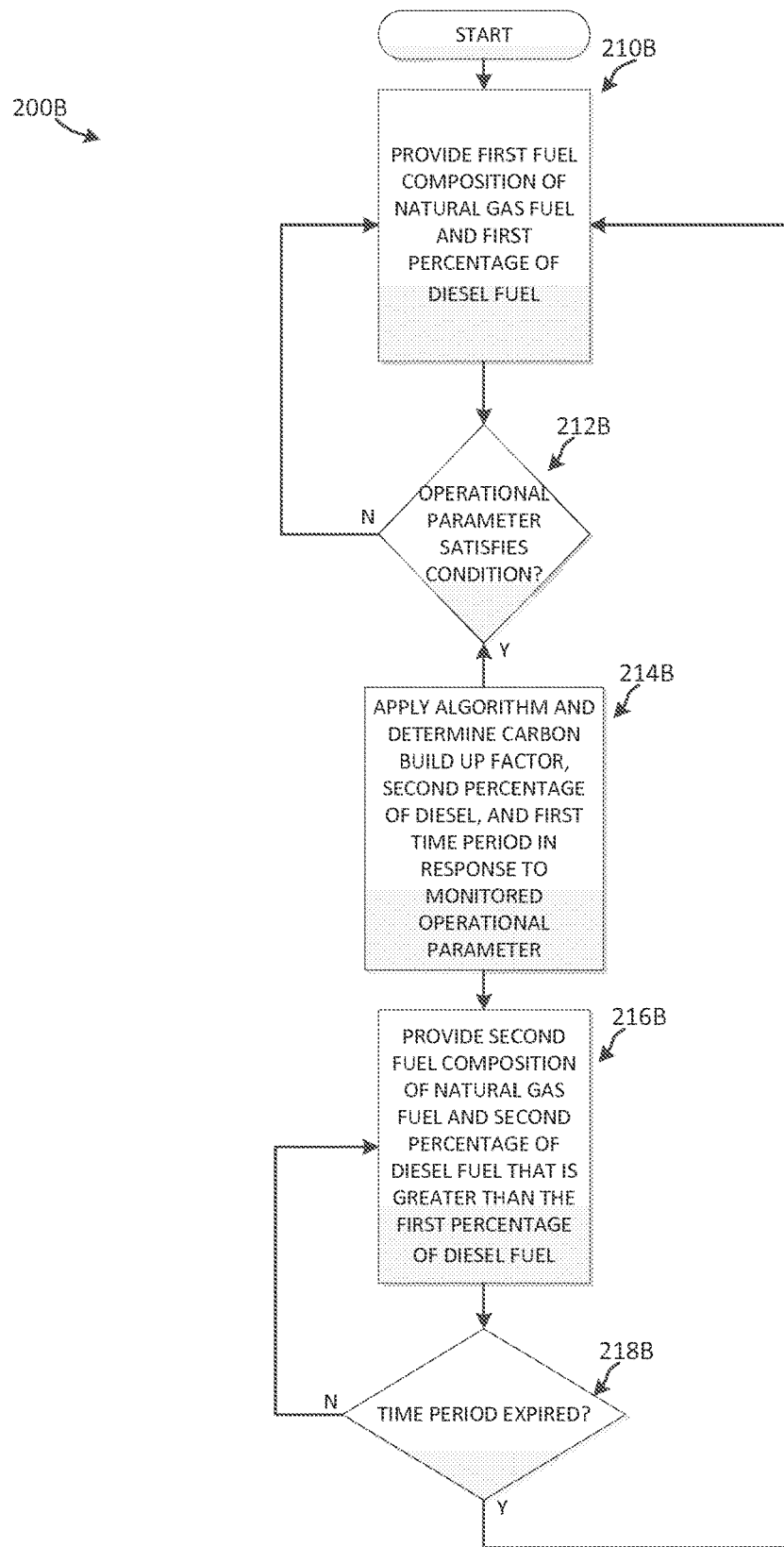

FIG. 2A and FIG. 2B are example methods 200A and method 200B according to the present disclosure for reducing carbonaceous deposits from a fuel injector nozzle. While this description refers to one fuel injector, it should be understood that typically multiple fuel injectors (e.g., one for each cylinder) are operated simultaneously. Regarding FIG. 2A and 2B, as indicated by block 210 in both embodiments, during normal operation a first composition of fuel is provided to fuel injector 130 of dual fuel engine 132. The first composition may comprise natural gas fuel and a first percentage of diesel fuel. An example dual fuel composition may be more than 50% natural gas and less than 50% diesel fuel. As indicated above, over time, use of such a fuel composition may result in carbon/coke deposits in fuel injector nozzle. During engine operation a variety of operational parameter signals 112 of dual fuel engine 132 may be monitored. Alternatively, upon providing the first composition, a time delay may be implemented to postpone monitoring of operational parameter signal 112 until after a desired time period of providing the first composition has lapsed. Operational parameter signal 112 may include one or more of a plurality of engine operating parameter signals such as engine run time, engine load, engine speed, or engine operating temperature. Additionally, in one aspect of method 200A and method 200B operational parameter signal 112 may further include engine operating parameter signals such as total quantity of natural gas fuel used, fuel filter restriction, fuel injector tip temperature, fuel injector drain fuel temperature, in-cylinder pressure, and in-cylinder exhaust gas temperature.

Controller 126 receives parameter signals 112 corresponding to the operational parameter signal being monitored while the first composition is provided to fuel injector 130. Controller 126 may be further configured to subject the parameter signals 112 to a test or condition to determine whether the condition is satisfied. Such conditions may include whether engine run time exceeds a predetermined threshold run time, whether engine load exceeds a predetermined threshold load, whether engine speed exceeds a predetermined threshold speed, and whether engine operating temperature exceeds a predetermined threshold operating temperature. Similarly, in other aspects of method 200A and method 200B the test or condition may further include, for example, whether total quantity of natural gas fuel used exceeds a predetermined threshold usage quantity, whether fuel filter restriction exceeds a predetermined threshold restriction, whether fuel injector tip temperature exceeds a predetermined threshold tip temperature, whether fuel injector drain fuel temperature exceeds a predetermined threshold drain fuel temperature, whether in-cylinder pressure falls below a predetermined threshold pressure, and whether in-cylinder exhaust gas temperature exceeds a predetermined threshold gas temperature.

With regard to engine run time as the operational parameter, it may be measured from a first combustion event within a cylinder of dual fuel engine 132 by a timer, such as timer 134. In this example, the engine run time operational parameter may be monitored by controller 126 reading data output by timer 134 to determine total engine run time that has elapsed since the occurrence of the first combustion event within the cylinder of dual fuel engine 132. In one aspect of method 200A and 200B, operational parameter signal 112 provides notification that a first combustion event has occurred and logic 120 causes timer 134 to begin measuring engine run time.

In one aspect of method 200B, engine run time may be weighted by a weight factor configured to estimate carbon build up (which may also be referred to as a carbon build up factor). Exemplary weight factors may be based on engine speed and/or engine load and logic 120 may be configured to determine the weight factors to be applied. In this aspect, both engine load and engine speed are received by controller 126 as parameter signals 112 generated by corresponding engine speed and engine load sensors coupled to dual fuel engine 132. In one example according to this aspect, logic 120 applies a weight factor that is proportional to engine speed, such that when engine speed increases the weight factor also increases. Likewise, in another example, logic 120 applies a weight factor that is proportional to engine load, such that when engine load increases the weight factor also increases. In the preceding examples, as engine run time elapses and the weight factors are applied, any increase or decrease in engine speed and engine load are provided as real time inputs to the algorithm disclosed above to determine an estimated carbonaceous deposit accumulation. For example, if dual fuel engine 132 runs for a certain period of time at a relatively high engine load or engine speed, under high natural gas substitution relative to diesel fuel operation, one would anticipate that the amount of carbon build up on the nozzle of fuel injector 130 would be higher; whereas, if dual fuel engine 132 runs for a certain period of time at a relatively low engine load or engine speed or under low natural gas substitution relative to diesel fuel operation, one would anticipate that the amount of coke buildup on the nozzle of fuel injector 130 would be lower. Actual weight factors to determine the precise build up rates of nozzle coke deposits would be empirically measured under a wide variety of engine speeds, loads and substitution rates, among other factors.

In another aspect of method 200B, engine run time may be weighted by a weight factor based on a substitution or dual fuel ratio of the first composition. In this aspect, logic 120 applies a weight factor that is proportional to the ratio of natural gas fuel and diesel fuel in the first composition such that, for example, when the percentage of natural gas fuel in the first composition increases the weight factor also increases. As indicated in the preceding example, as engine run time elapses and the dual fuel ratio weight factor is applied, any increase or decrease in the percentage of natural gas fuel in the first composition is provided as a real-time input to the algorithm to determine an estimated carbonaceous deposit accumulation on the nozzle of fuel injector 130.

As disclosed above, operational parameter signals 112 of dual fuel engine 132 are received by controller 126 and subjected to a test or condition to determine if the parameter signals satisfy a first condition (block 212A and 212B). However, in the various aspects of method 200B, logic 120 may cause controller 126 to apply an algorithm to determine an estimated carbon build up factor in response to the monitored operational parameter satisfying a condition (block 214B). Fuel injector carbonaceous deposit propensity and formation rate may be determined based on monitoring data corresponding to a plurality of engine operating conditions. Data points associated with certain individual operational parameter signals 112 may correspond to a specific percentage of carbonaceous deposit accumulation on fuel injector 130. Alternatively, data points associated with a plurality of operational parameter signals 112 may be provided as inputs to the algorithm to determine an estimated carbon build up factor, a second percentage of diesel fuel, and a first time period.

Referring again to method 200A and method 200B, the test applied by controller 126 occurs at block 212, wherein the method determines whether monitored operational parameter signal 112 satisfies a first condition. If operational parameter signal 112 does not satisfy the first condition, then the method returns to block 210, the first composition is further used, and parameter signals 112 are further monitored. In method 200A, if operational parameter signal 112 satisfies the first condition, then the method proceeds to block 214A. In method 200B, if operational parameter signal 112 satisfies the first condition, then the method applies and the algorithm at block 214B and advances to block 216B. At block 214A and 216B, a second composition is provided to fuel injector 130. As described above with regard to FIG. 1, logic 120 causes controller 126 to send fuel supply assembly control signal 114 through interface 128 to cause fuel supply assembly 116 to provide a second composition to fuel injector 130 via dual fuel supply line 128. The second composition includes natural gas and a second percentage of diesel fuel that is greater than the first percentage of diesel fuel provided at block 210A and 210B. The second composition may be further described as comprising an injector cavitation diesel fuel threshold value, wherein the threshold value is a second percentage of diesel fuel that is sufficiently greater than the first percentage of diesel fuel to cause cavitation to occur within fuel injector 130. The higher percentage of diesel fuel in the second composition causes a series of bubbles and voids within the dual fuel mixture such that upon introduction into fuel injector 130, cavitation occurs. The high pressures and fuel flow rate of the dual fuel composition entering fuel injector 130 contributes to the formation of these bubbles and voids and the manner in which the cavitation collides with walls of the injector nozzle such that abrasion and breaking off of carbonaceous deposits occurs. The carbonaceous deposits which are scavenged from the fuel injector nozzle exit fuel injector 130 during an injection event. To induce cavitation and thereby cause a reduction in the carbonaceous deposits from the injector nozzle, the second percentage of diesel fuel within the second composition should range from at least 50% of the second composition to greater than 95% of the second composition. In one embodiment of the present disclosure, the second composition comprises 100% diesel fuel.

In method 200A, the second composition is only provided to fuel injector 130 for a certain time period, the duration of which may be determined in various ways as is described below. Whereas in method 200B the time period is determined in response to the monitored operational parameter signal 112 satisfying a first condition, wherein the parameter signal data value corresponds to a carbon build up factor and the first time period is based on the carbon buildup factor. As indicated by block 216A and 218B, the second composition is supplied to fuel injector 130 until the time period expires. When the time period expires, the method returns to block 210A or 210B and the first composition is once again supplied to fuel injector 130. With regard to method 200A and 200B, in either embodiment, method 200 runs in a continuous loop for the entire duration of engine operation. In another aspect of either embodiment, method 200 is activated according to a predefined schedule. In yet another aspect of either embodiment, method 200 is activated manually by an operator.

One of ordinary skill in the art of dual fuel engine control systems would be able to implement various designs to monitor any of the variety of additional engine operating parameter signals 112 and to determine whether the monitored signals satisfy a corresponding condition. For example, with regard to fuel injector tip temperature as the monitored operational parameter signal 112, it may be measured by a thermocouple disposed within fuel injector 130 and affixed on an interior wall of the injector tip. As indicated above, multiple fuel injectors are operated simultaneously in dual fuel engine 132. Therefore, when measuring injector nozzle tip temperature, a plurality of thermocouples (e.g. one for each cylinder) providing a plurality of temperature data values are in electrical communication with controller 126 via operational parameter signal 112. As disclosed above, in method 200A and 200B controller 126 may be configured to subject the parameter signals 112 to a test or condition to determine whether a condition is satisfied. When parameter signals 112 correspond to injector tip temperature of fuel injector 130, the condition is whether fuel injector tip temperature exceeds a predetermined threshold tip temperature. As is understood by those skilled in the art, elevated injector tip temperatures will provide an indication of carbonaceous deposit build up on the nozzle of fuel injector 130.

In another example, if exhaust gas temperature is the monitored operational parameter, it may be measured by an exhaust gas temperature sensor disposed within an exhaust manifold and affixed adjacent the exhaust valve of a cylinder within dual fuel engine 132. Dual fuel engine 132 includes a plurality of cylinders, each of which accommodates a reciprocating piston defining a combustion chamber therein. During operation of engine 132, as part of the engine cycle, the pistons rise from bottom dead center (BDC) to top dead center (TDC) as they complete an intake stroke, a compression stroke, an expansion stroke, and an exhaust stroke. During the exhaust stroke, the rise from BDC to TDC discharges exhaust gas from the combustion chamber, through the exhaust valves, and into the exhaust manifold. The temperature sensor affixed adjacent the exhaust valve provides a temperature of the exhaust gas immediately after the gas exists the combustion chamber of the cylinder. This temperature value provided by the sensor is thus indicative of the in-cylinder exhaust gas temperature corresponding to a particular engine cylinder and a particular fuel injector 130. As disclosed, controller 126 may be configured to subject the parameter signals 112 to a test or condition to determine whether a condition is satisfied. When parameter signals 112 correspond to the exhaust gas temperature of a particular cylinder, the condition is whether in-cylinder exhaust gas temperature exceeds a predetermined threshold gas temperature. As is understood by those skilled in the art, elevated in-cylinder exhaust gas temperatures will provide an indication of carbonaceous deposit build up on the nozzle of fuel injector 130 providing fuel to a particular cylinder.

As noted above, one of ordinary skill in the art of dual fuel engine control systems would be able to implement various designs to monitor additional engine operating parameter signals 112, such as: total quantity of natural gas fuel used (e.g. monitor signal output from fuel quantity sensors); fuel injector drain fuel temperature (e.g. monitor signal output from temperature sensors); fuel filter restriction (e.g. monitor signal output from fuel flow sensors); and in-cylinder pressure (e.g. monitor signal output from pressure sensors). Likewise, one of ordinary skill in the art would be able to implement a basic comparator circuit to determine whether the current value of the monitored parameter signals exceeds or has fallen below a predetermined threshold value and thus satisfies a corresponding first condition. Additionally, when sensing in-cylinder pressures below a predetermined threshold pressure, the monitored parameter signal 112 should correspond to a pressure value obtained during a combustion event within a cylinder of dual fuel engine 132. Low in-cylinder combustion pressure (e.g. below a predetermined threshold pressure) indicates low fuel quantity during an injection event which correlates to higher carbon build up on the nozzle of fuel injector 130. Therefore, monitoring parameter signal 112 corresponding to in-cylinder pressure during a combustion event enables controller 126 to command fuel supply assembly 116 to provide the second fuel composition in response to the in-cylinder pressure falling below a threshold pressure.

Figure 3:
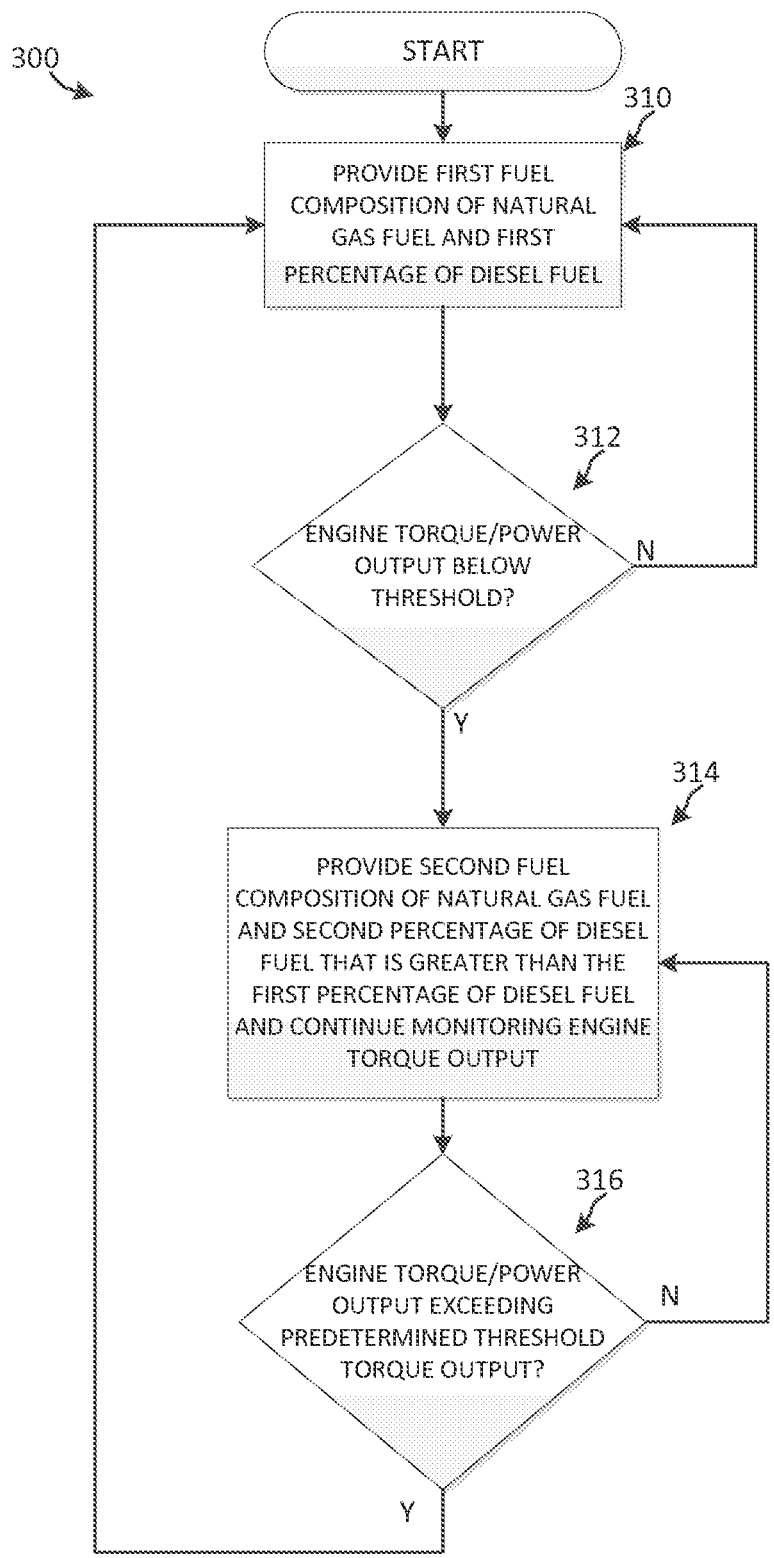

FIG. 3 is another example method 300 according to the present disclosure for reducing carbonaceous deposits from a fuel injector nozzle. Method 300 comprises substantially the same steps as method 200. As indicated by block 310 a first composition is provided to fuel injector 130 of dual fuel engine 132, wherein the first composition comprises natural gas fuel and a first percentage of diesel fuel. In method 300, engine torque output of dual fuel engine 132 is monitored as the operational parameter of interest. As is understood by those skilled in the art, engine torque may be measured directly by an engine torque meter or a substitute such as an alternator output on a generator, or a pressure measurement on a hydraulic fracturing rig. Engine torque may also be inferred from a variety of different sensed signals such as a combination of engine speed, throttle position, intake manifold temperature and pressure, turbine speed, calculated fuel rate of diesel and engine fuel, to infer the engine torque (through calculations). The engine torque of dual fuel engine 132 is received and monitored as the first composition is provided to fuel injector 130. As indicated above, the accumulation of carbonaceous deposits on fuel injector nozzles in dual fuel engine 132 results in a gradual reduction in engine torque or power output. A decline in engine torque as well as increased pollutant emissions are typical responses to injector nozzle deposit formation. Thus, method 300 monitors the engine torque of dual fuel engine 132 and responds when engine power output degrades below a threshold value. This step is accomplished at block 312, in which torque is compared to a threshold. If torque remains above the threshold, then the first composition is further provided to fuel injector 130 and torque is further monitored. If torque falls below the threshold, then method 300 advances to block 314.

At block 314 a second composition is provided to fuel injector 130 of dual fuel engine 132. The second composition includes natural gas fuel and a second percentage of diesel fuel that is greater than the first percentage of diesel fuel. Controller 126 may continue monitoring engine torque concurrent with providing the second composition to fuel injector 130 to determine whether engine torque exceeds a predetermined torque output (i.e., satisfies a second condition). In other words, fuel supply assembly 116 supplies the second, high diesel composition for a period of time corresponding to the time required for the cavitation from the second composition to cause engine torque to recover to a value above the predetermined torque output. Thus, as indicated by block 316, controller 126 may command fuel supply assembly 116 to switch back to the first composition in response to engine torque exceeding a predetermined threshold torque output.

Figure 4:
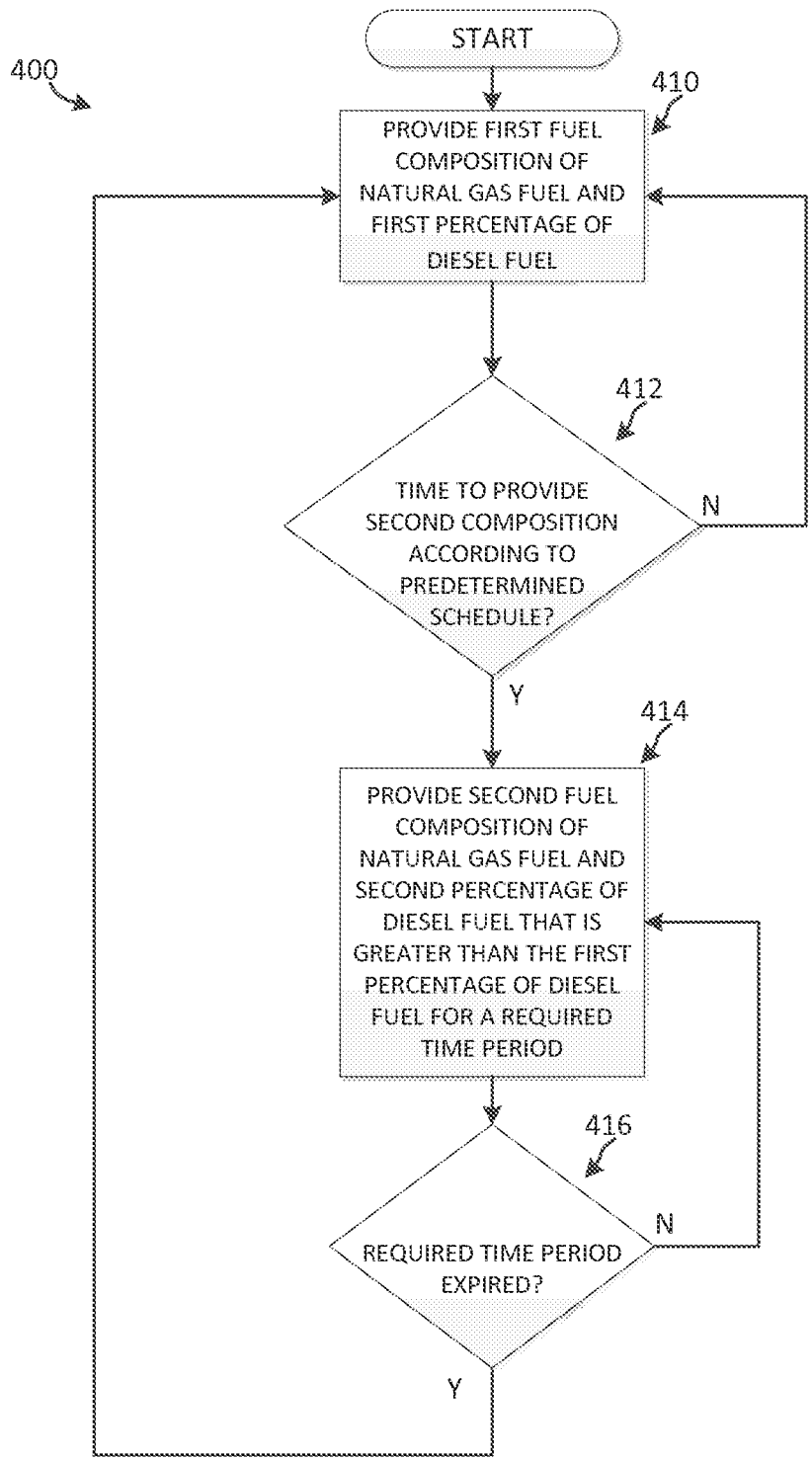

FIG. 4 is an example method 400 according to the present disclosure for reducing carbonaceous deposits from a fuel injector nozzle. As indicated by block 410, a first composition including natural gas fuel and a first percentage of diesel fuel is provided to fuel injector 130 of dual fuel engine 132. During engine operation a predetermined schedule is monitored. The predetermined schedule may be stored in memory 136 and may include a plurality of time intervals for providing a second composition including natural gas fuel and a second percentage of diesel fuel that is greater than the first percentage of diesel fuel. For example, logic 120 may be configured to access the predetermined scheduled stored in memory 136 to determine, as indicated by block 412, the appropriate time to provide the second composition. If it is not time to provide the second composition according to the predetermined schedule then the method returns to block 410, the first composition is further used, and the predetermined schedule is further monitored. If logic 120 accesses the schedule and determines it is time to provide the second composition, then the method proceeds to block 414. At block 414, controller 126 may command fuel supply assembly 116 to provide the second composition for a required time period as defined in the predetermined schedule. In one aspect of method 400, timer 134 may be configured to function as a real-time clock providing current time as measured in seconds, minutes, hours, days or additional units of time as defined in the predetermined schedule. As indicated by block 416, controller 126 may monitor the current time output by timer 134 and compare the current time to time values in the predetermined schedule stored in memory 136. The second composition is provided for a predefined duration until timer 134 indicates that current time is equal to a time value in the predetermined schedule (i.e., the required time period has expired). The method then returns to block 410.

As an example of the foregoing, the predetermined schedule may define that the second composition be provided based on a fixed time interval. For example, logic 120 may cause controller 126 to provide the second composition every 72 hours for 10 minute durations, every 144 hours for 20 minute durations, or any other variation of a fixed time interval and corresponding duration as defined in the predetermined schedule. At block 416, controller 126 may command fuel supply assembly 116 to switch back to the first composition in response to the expiration of the time period or duration for providing the second percentage of diesel. Thus, in method 400, controller 126 periodically causes an increase in the diesel percentage of the dual fuel composition for a certain time period according to a predetermined schedule of a fixed or intermittent interval.

Figure 5:
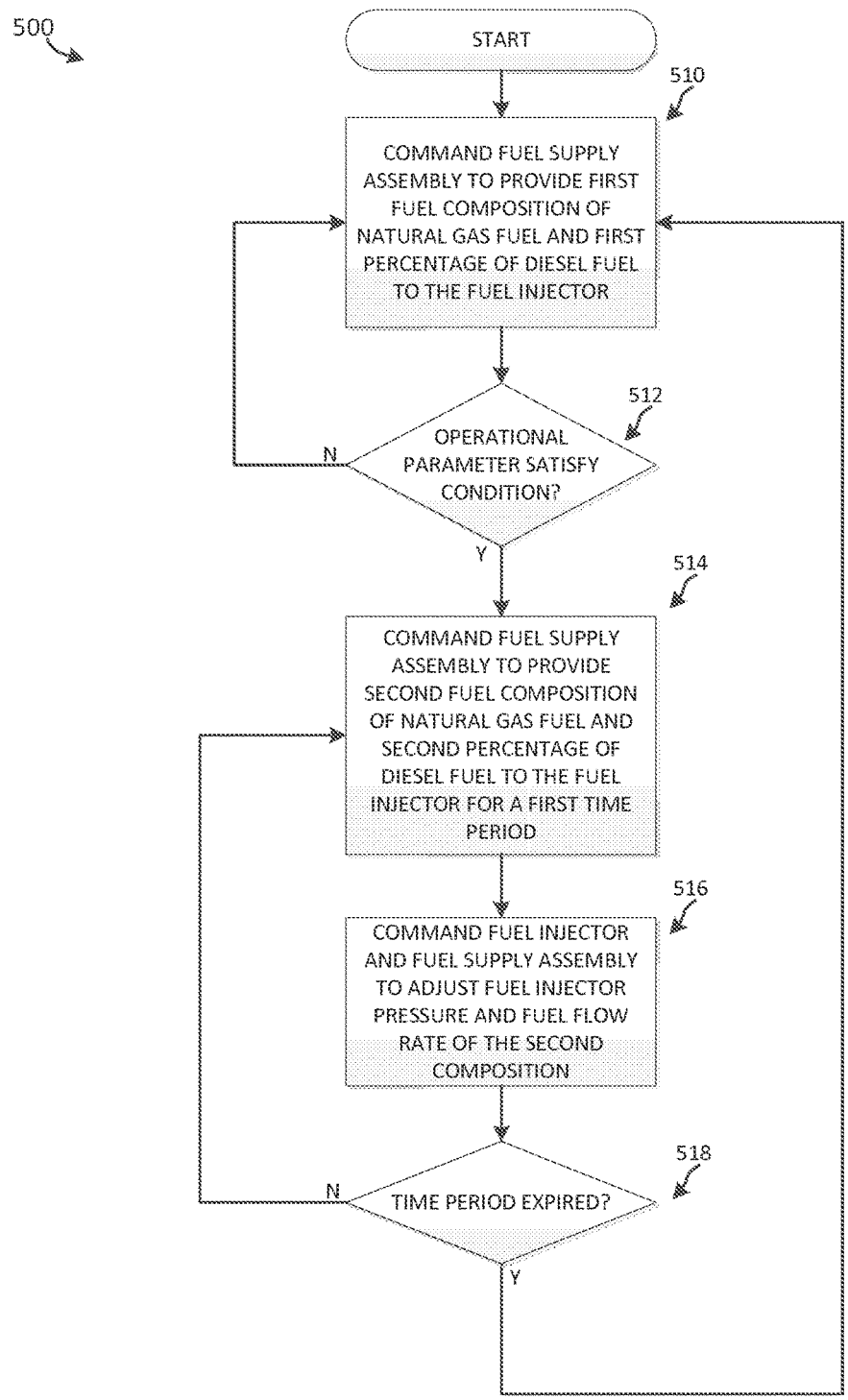

FIG. 5 depicts another example method 500 according to the present disclosure for reducing carbonaceous deposits from a fuel injector nozzle. At block 510 a first composition comprising natural gas fuel and a first percentage of diesel fuel is provided to fuel injector 130 of dual fuel engine 132. As described above, during engine operation one or more operational parameter signals 112 of dual fuel engine 132 may be monitored. At block 512, method 500 determines whether monitored operational parameter signal 112 satisfies a first condition. If parameter signal 112 does not satisfy the first condition, then the method returns to block 510, the first composition is further used, and parameter signal 512 is further monitored. If parameter signal 112 satisfies the first condition then method 500 advances to block 514. At block 514, method 500 determines a first time period to provide a second composition in response to monitored operational parameter signal 112 satisfying the condition. As described below in further detail, method 500 may determine the first time period based on a predetermined scheduled stored in memory 136 or by applying the algorithm to determine a first time period based on an estimated carbon build factor determined from data values associated with the monitored operational parameter signals 112. Additionally, at block 514 controller 126 commands fuel supply assembly 116 to provide a second composition comprising natural gas fuel and a second percentage of diesel fuel that is greater than the first percentage of diesel fuel. The second composition is provided to dual fuel engine 132 for the duration of the first time period determined at block 514. At block 516, while the second composition is provided, controller 126 further commands fuel supply assembly 116 and fuel injector 130 to adjust the fuel injector pressure and fuel flow rate of the second composition. While cavitation occurs in response to increasing the diesel percentage in a dual fuel composition, adjustments to fuel injector pressure and fuel flow rate of the second composition, provide additional methods to refine the degree of cavitation occurrence within fuel injector 130. For example, under conditions of high diesel fueling and high injection pressure, cavitation and flow turbulence are more likely to occur in the spray holes and nozzle internal flow passages which will thus promote scavenging of the carbon/coke deposits on the nozzle of fuel injector 130. Alternatively, lower flow and pressure conditions will inhibit the cavitation and flow turbulence and thus inhibit scavenging of the nozzle carbon/coke deposits. A variety of scavenging rates can be mapped as a function of fuel injector pressure and fuel flow rate and thus used to define a scavenging cycle time sufficient to remove the carbon/coke deposits on the nozzle of fuel injector 130. As indicated by block 518, the second composition is supplied to fuel injector 130 until the time period determined above expires. When the time period expires, method 500 returns to block 510 and the first composition is once again supplied to fuel injector 130.

In one aspect of method 500 the monitored operational parameter signal 112 corresponds to engine run time and the first condition is engine run time exceeding a predetermined threshold run time. When engine run time exceeds the threshold, method 500 provides the second composition for a time period as defined, for example, in a predetermined schedule stored in memory 136. For example, if the predetermined threshold run time is set to six hours and engine run time exceeds six hours then controller 126 will command fuel supply assembly 116 to provide the second composition for a first time period of, for example, 30 minutes. While the second composition is provided, controller 126 monitors timer 134 to determine whether the required 30 minute time period has expired (block 518). If the time period has not expired then the second composition continues to be provided. When the time period expires, the method returns to block 510 and the first composition is once again provided.

In another aspect of method 500 the monitored operational parameter signal 112 corresponds to, for example, in-cylinder exhaust gas temperature and the first condition is exhaust gas temperature exceeding a predetermined threshold gas temperature. When in-cylinder exhaust gas temperature exceeds the threshold, method 500 provides the second composition for a first time period (block 514). During this step controller 126 applies an algorithm to determine a carbon build up factor in response to the monitored operational parameter satisfying a first condition. The data value of the in-cylinder exhaust gas temperature is provided as an input to the algorithm. As disclosed above, data points associated with certain operational parameter signals 112 may correspond to a percentage of carbonaceous deposit accumulation on fuel injector 130. In this aspect of method 500, the time period determined at block 514 is based on the carbon build up factor and hence will be sufficient to reduce carbon build up on the nozzle of fuel injector 130. Thus, in method 500 the algorithm may be applied to determine a first time period in response to the exhaust gas temperature parameter signal satisfying a condition, wherein the data value or the parameter signal corresponds to a percentage of carbonaceous deposit accumulation on the nozzle of fuel injector 130.

As indicated above, data points associated with operational parameter signal 112 may correspond to a carbon build up factor. For example, as indicated in the preceding example, in-cylinder exhaust gas temperature in excess of a predetermined threshold gas temperature may result in a 15% carbonaceous deposit formation on the fuel injector nozzle, and in response, controller 126 may provide the second composition for a minimum required time period as determined by the algorithm. Additionally, data points associated with operational parameter signal 112 which indicate a predicted amount of carbonaceous deposit formation may further correspond to a variety of time periods defined in the pre-determined schedule stored in memory 136. The pre-determined schedule may be comprised of a look-up table or data array which defines various time periods for providing the second composition in response to a particular parameter signal having a particular data value.

What is claimed is:

1. A method of reducing carbonaceous deposits on a fuel injector comprising:
    providing a first fuel composition to the fuel injector comprising gaseous fuel and a first percentage of liquid fuel; and
    providing a second fuel composition to the fuel injector comprising a second percentage of liquid fuel that is greater than the first percentage of liquid fuel, wherein the second percentage of liquid fuel causes cavitation to occur within the fuel injector, thereby reducing carbonaceous deposits,
        wherein the second percentage of the liquid fuel is greater than or equal to 50% and less than 100%.

2. The method of claim 1, further comprising providing the second composition for a first predetermined time period, and then providing the first composition.

3. The method of claim 1, wherein the cavitation reduces carbonaceous deposits adjacent a spray hole of the fuel injector.

4. The method of claim 1, wherein the second percentage of liquid fuel is greater than 95% of the second composition.

5. The method of claim 1, wherein the second composition is provided for a first time period determined in response to at least one operational parameter satisfying a first condition.

6. The method of claim 5, wherein the at least one operational parameter includes at least one of engine run time, engine load, engine speed, and engine operating temperature.

7. The method of claim 6, wherein the first condition is at least one of engine run time in excess of a predetermined threshold run time, engine load in excess of a predetermined threshold load, engine speed in excess of a predetermined threshold speed, and engine operating temperature in excess of a predetermined threshold operating temperature.

8. The method of claim 5, wherein the at least one operational parameter includes at least one of a quantity of gaseous fuel used, a fuel filter restriction percentage, a fuel injector tip temperature, a fuel injector drain fuel temperature, an in-cylinder pressure, and an in-cylinder exhaust gas temperature.

9. The method of claim 8, wherein the first condition further includes at least one of a quantity of gaseous fuel used in excess of a predetermined threshold usage quantity, a fuel filter restriction percentage in excess of a predetermined threshold restriction percentage, a fuel injector tip temperature in excess of a predetermined threshold tip temperature, a fuel injector drain fuel temperature in excess of a predetermined threshold drain fuel temperature, an in-cylinder pressure below a predetermined threshold pressure, and an in-cylinder exhaust gas temperature in excess of a predetermined threshold gas temperature.

10. The method of claim 8, wherein the in-cylinder pressure includes a pressure in a cylinder of a dual fuel engine during a combustion event.

11. The method of claim 8, wherein the in-cylinder exhaust gas temperature includes an exhaust gas temperature in the cylinder of a dual fuel engine after the exhaust stroke.

12. The method of claim 5, wherein an engine torque output is monitored concurrent with providing the second composition for the first time period.

13. The method of claim 12, further comprising providing the second composition and then providing the first composition in response to the engine torque output exceeding a predetermined threshold torque output.

14. The method of claim 1, wherein providing the second composition for a first time period includes periodically providing the second composition for the first time period according to a predetermined schedule.

15. A method comprising:
    commanding a fuel supply assembly to provide a first fuel composition to a fuel injector in a dual fuel engine, the first composition comprising gaseous fuel and a first percentage of liquid fuel;
    monitoring an operational parameter of the dual fuel engine;
    commanding the fuel supply assembly to provide a second fuel composition to the fuel injector for a first time period in response to the operational parameter satisfying a first condition, wherein the second fuel composition includes a percentage of liquid fuel that is greater than or equal to an injector cavitation liquid fuel threshold value, wherein the second fuel composition causes cavitation to occur within the fuel injector;
        wherein the percentage of liquid fuel of the second fuel composition is greater than or equal to 50% and less than or equal to 100%.

16. The method of claim 15, wherein commanding the fuel supply assembly to provide a second composition further includes commanding the fuel supply assembly to adjust a fuel injector pressure and a fuel flow rate of the second composition.

17. The method of claim 15, wherein cavitation reduces carbonaceous deposits adjacent a spray hole of the fuel injector.

18. The method of claim 15, further including determining a carbon build up factor in response to the operational parameter satisfying a first condition, and determining the first time period based on the carbon build up factor.

19. The method of claim 15, wherein the operational parameter is engine run time and the first condition is engine run time in excess of a predetermined threshold run time.

20. The method of claim 15, wherein the operational parameter is engine run time weighted by at least one of a plurality of weight factors, the method further comprising determining a carbon build up factor based on the operational parameter.

21. The method of claim 20, wherein the plurality of weight factors includes at least one of engine speed, engine load, and the percentage of gaseous fuel in the first composition.

22. The method of claim 21, wherein a magnitude of the engine speed weight factor increases as the engine speed increases.

23. The method of claim 21, wherein a magnitude of the engine load weight factor increases as the engine load increases.

24. The method of claim 21, wherein a magnitude of the gaseous fuel weight factor increases as the percentage of natural gas fuel in the first composition increases.

25. The method of claim 15, wherein the operational parameter includes at least one of engine load, engine speed, and engine operating temperature.

26. The method of claim 24, wherein the first condition includes at least one of engine load in excess of a predetermined threshold load, engine speed in excess of a predetermined threshold speed, and engine operating temperature in excess of a predetermined threshold operating temperature.

27. The method of claim 15, wherein the operational parameter includes at least one of quantity of gaseous fuel used, fuel filter restriction percentage, fuel injector tip temperature, fuel injector drain fuel temperature, in-cylinder pressure, and in-cylinder exhaust gas temperature.

28. The method of claim 26, wherein the first condition further includes at least one of quantity of gaseous fuel used in excess of a predetermined threshold usage quantity, fuel filter restriction percentage in excess of a predetermined threshold restriction percentage, fuel injector tip temperature in excess of a predetermined threshold tip temperature, fuel injector drain fuel temperature in excess of a predetermined threshold drain fuel temperature, in-cylinder pressure below a predetermined threshold pressure, and in-cylinder exhaust gas temperature in excess of a predetermined threshold gas temperature.

29. The method of claim 26, wherein the in-cylinder pressure includes a pressure in a cylinder of a dual fuel engine during a combustion event.

30. The method of claim 26, wherein the in-cylinder exhaust gas temperature includes an exhaust gas temperature in the cylinder of a dual fuel engine after the exhaust stroke.

31. The method of claim 15, wherein commanding the fuel supply assembly to provide the second composition includes applying an algorithm to determine at least one of the second percentage of liquid fuel, the first time period, and a carbon build up factor.

32. An apparatus, comprising:
a controller including a fuel supply interface configured to provide control signals to a fuel supply assembly for providing a dual fuel composition including a diesel percentage to a dual fuel engine;
a fuel injector interface receiving parameter signals corresponding to an operational parameter of the dual fuel engine; and
logic monitoring the parameter signals and to generate the control signals to cause an increase in the diesel percentage of the dual fuel composition in response to the operational parameter satisfying a condition, wherein the increase in the diesel percentage of the dual fuel composition causes cavitation to occur in a fuel injector and results in the diesel percentage of the dual fuel composition being greater than or equal to 50% and less than 100%.

33. The apparatus of claim 32, wherein the operational parameter is engine torque output and the condition is engine torque output below a predetermined threshold torque output.

34. The apparatus of claim 33, wherein the logic is further configured to generate control signals to cause an increase in the diesel percentage of the dual fuel composition in response to the engine torque output below a predetermined threshold torque output.

35. The apparatus of claim 32, wherein the logic further generates control signals to cause an increase in the diesel percentage of the dual fuel composition for a first time period in response to the operational parameter satisfying the condition.

36. The apparatus of claim 32, wherein the logic is further configured to generate control signals to periodically cause an increase in the diesel percentage of the dual fuel composition for a first time period according to at least one of, a predetermined schedule, an algorithm, and a carbon build up factor.

* * * * *